United States Patent [19]
Ohba et al.

[11] Patent Number: 5,214,758
[45] Date of Patent: May 25, 1993

[54] ANIMATION PRODUCING APPARATUS

[75] Inventors: Akio Ohba; Shinichi Fukushima, both of Kanagawa; Koji Kaneda, Tokyo, all of Japan

[73] Assignee: Sony Corporation, Tokyo, Japan

[21] Appl. No.: 609,612

[22] Filed: Nov. 6, 1990

[30] Foreign Application Priority Data

Nov. 14, 1989 [JP] Japan ................................ 1-295756
Jan. 21, 1990 [JP] Japan ................................ 2-10861

[51] Int. Cl.$^5$ ............................................. G06F 15/62
[52] U.S. Cl. .................................. 395/164; 395/141; 395/152; 340/750
[58] Field of Search .................. 364/518, 521, 522; 340/747, 750, 798, 799, 734; 382/49, 54; 395/164, 141, 135, 152

[56] References Cited

U.S. PATENT DOCUMENTS

| | | | |
|---|---|---|---|
| 3,510,210 | 5/1970 | Haney | 395/152 |
| 5,025,394 | 6/1991 | Parke | 364/518 |
| 5,050,102 | 9/1991 | Sun et al. | 364/521 |
| 5,101,364 | 3/1992 | Davenport et al. | 395/152 |

Primary Examiner—Gary V. Harkcom
Assistant Examiner—Phu K. Nguyen
Attorney, Agent, or Firm—Lewis H. Eslinger; Jay H. Maioli

[57] ABSTRACT

An animation producing apparatus which produces an animation on the basis of a fundamental shape and parameter. This animation producing apparatus is comprised of an input device for inputting a plurality set of fundamental shapes and a plurality of parameters corresponding to the plurality of fundamental shapes, a memory for storing therein the plurality of fundamental shapes and the plurality of parameters, a computing device for producing an animation by an interpolation process on the basis of the plurality of fundamental shapes and the plurality of parameters read-out from the memory and a display device for displaying thereon the animation produced by the computing device, in which values of the plurality of parameters stored in the memory can be independently varied, added or deleted by the input device.

9 Claims, 6 Drawing Sheets

FIG. 5A  FIG. 5B  FIG. 5C
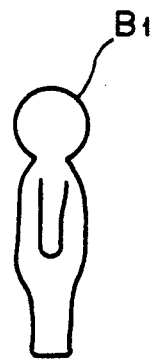 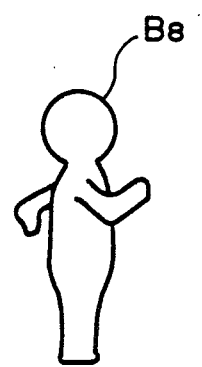 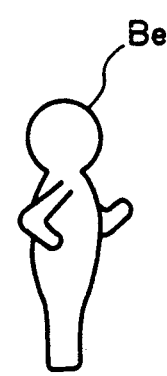
FIG. 6A  FIG. 6B  FIG. 6C
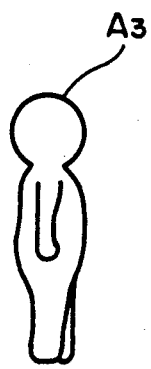 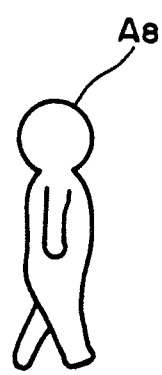 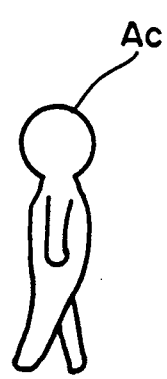

ANIMATION PRODUCING APPARATUS

BACKGROUND OF THE INVENTION

1. Field of the Invention

The present invention generally relates to an animation producing apparatus for producing animations and, more particularly, is directed to an animation producing apparatus which produces an animation by using a plurality of parameters and a plurality of fundamental shapes.

2. Description of the Prior Art

When an animation of a predetermined character is produced by computer graphics, data of fundamental configuration (i.e. fundamental shape) of the character are inputted and motions of respective parts of the character are given by values of respective parameters. Then, values of all the parameters are gradually changed along a certain time axis, whereby the character can be moved in a desirable fashion. The time axis is what might be called a time line and the unit of the time line is, by way of example, [hour: minute: second: frame number].

FIG. 1 shows a conventional animation producing apparatus which utilizes computer graphics.

In FIG. 1, reference numeral 1 designates a keyboard, 2 a video image input apparatus such as a digitizer or the like, 3 a central processing unit (CPU), 4 a memory such as a random access memory (RAM), magnetic disc apparatus or the like, and 5 a video image display apparatus with a display picture screen 6, such as a cathode ray tube (CRT) Data of a fundamental configuration (i.e. fundamental shape) of a predetermined character are stored in the memory 4 input from the keyboard 1 and the video image input apparatus 2 through the CPU 3. The data of the fundamental shape of the character itself may be generated by an operation of the computer (see U.S. Pat. No. 4,791,581).

If the character is, for example, a man, the man's motions can be expressed by a parameter group P which is formed of three parameters (i.e. a parameter for designating waving of arms, parameter for designating motion of legs and a parameter designating motion of the character in the lateral direction).

More specifically, as shown in FIG. 2, the operator operates the keyboard 1 to set in the memory 4 values $P_0$, $P_1$ and $P_2$ of the parameter group P at timing points $t_0$, $t_1$ and $t_2$ on one time line T. Then, the CPU 3 performs interpolation operations to generate values of parameter group P between timing points $t_0$ and $t_1$ and between timing points $t_1$ and $t_2$ in units of the frame period, whereby a value of parameter group $P_x$ at, for example, timing point $t_x$ ($t_0 < t_x < t_1$) becomes an intermediate value between the values $P_0$ and $P_1$. Assuming that characters $7_0$, $7_1$ and $7_2$ of shapes designated by the operator are displayed on a display picture screen 6 of the video image display apparatus 5 in response to the values $P_0$, $P_1$ and $P_2$ of the parameter group P, the shape of the character $7_0$ is gradually changed to that of the character $7_1$ on the display picture screen 6 from timing points $t_0$ to $t_1$, and the shape of character $7_1$ is gradually changed to that of character $7_2$ on the display picture screen 6 from timing points $t_1$ to $t_2$.

However, as described above, the operator must simultaneously determine all values of parameters for instructing the motion of arms, the motion of legs and the moving amount of the character in the lateral direction at timing points $t_0$, $t_1$ and $t_2$ which are selected by the operator along one time line T. Accordingly, when the operator wants to change only the motion of the arm of the character after viewing the animations, the operator has to change the parameter for designating the motion of arm along the time line T and must also determine the values of all parameters at each time point one more time. Therefore, the motion of a certain part of the character cannot be changed efficiently.

OBJECTS AND SUMMARY OF THE INVENTION

Accordingly, it is an object of the present invention to provide an improved animation producing apparatus in which the aforementioned shortcomings and disadvantages of the prior art can be substantially eliminated.

More specifically, it is an object of the present invention to provide an animation producing apparatus in which a motion of a certain part of the character can be changed with ease.

It is another object of the present invention to provide an animation producing apparatus in which a motion of the character can be fine-adjusted.

It is a further object of the present invention to provide an animation producing apparatus in which an animation can be moved in response to a synthesized sound in a real time fashion.

According to a first aspect of the present invention, an animation producing apparatus for producing an animation on the basis of fundamental shapes and parameters is comprised of an input device for inputting a plurality of fundamental shapes and a plurality of parameters corresponding to the plurality of fundamental shapes, a memory for storing therein the plurality of fundamental shapes and the plurality of parameters, values of the plurality of parameters stored in the memory being independently varied, added or deleted by the input device, a computing circuit for producing an animation by an interpolation on the basis of the plurality of fundamental shapes and the plurality of parameters read-out from the memory, and a display for displaying thereon the animation produced by the computing circuit.

As a second aspect of the present invention, an animation producing apparatus for producing an animation on the basis of fundamental shapes and parameters is comprised of a first memory for storing therein a plurality of fundamental shapes, a second memory for storing a plurality of first parameters corresponding to the plurality of fundamental shapes, an input device for inputting a plurality of second parameters corresponding to the plurality of fundamental shapes, a plurality of adders for adding the plurality of first parameters read-out from the second memory and the plurality of second parameters inputted by the input device with predetermined ratios thereby to generate a plurality of third parameters, an image processor for producing an animation by an interpolation process on the basis of the plurality of fundamental shapes read-out from the first memory and the plurality of third parameters generated from the plurality of adders, and a display for displaying the animation produced by the image processor.

In accordance with a third aspect of the present invention, an animation producing apparatus for producing an animation on the basis of fundamental shapes and parameters is comprised of a memory for storing a plurality of fundamental shapes, a musical instrument disital interface (MIDI) signal generating circuit for generating a MIDI signal, a parameter generating circuit for generating a plurality of parameters corresponding to the plurality of fundamental shapes on the basis of the MIDI signal, an image processor for producing an animation by an interpolation process on the basis of the plurality of fundamental shapes read-out from the memory and the plurality of parameters generated from the parameter generating circuit, a display for displaying thereon the animation produced by the image processor, and a synthesized sound generating circuit for generating a synthesized sound on the basis of the MIDI signal.

The preceding, and other objects, features and advantages of the present invention will be apparent in the following detailed description of illustrative embodiments to be taken in conjunction with the accompanying drawings, in which like reference numerals are used to identify the same or similar parts in the several views.

BRIEF DESCRIPTION OF THE DRAWINGS

FIGS. 5A–5C are schematic diagrams showing fundamental shapes for arms used in the animation producing apparatus of FIG. 3;

FIGS. 6A–6C are schematic diagrams showing fundamental shapes for legs, used in the animation producing apparatus of FIG. 3;

DETAILED DESCRIPTION OF THE PREFERRED EMBODIMENTS

Figure 1:
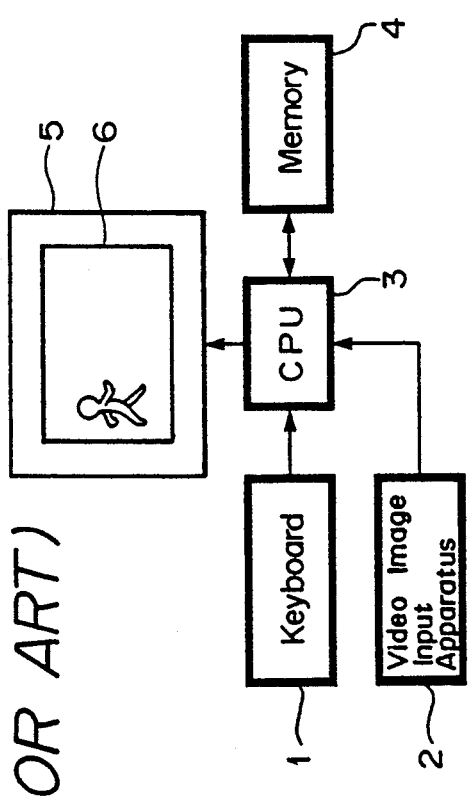
FIG. 1 is a schematic diagram showing an example of a conventional animation producing apparatus.
Figure 2:
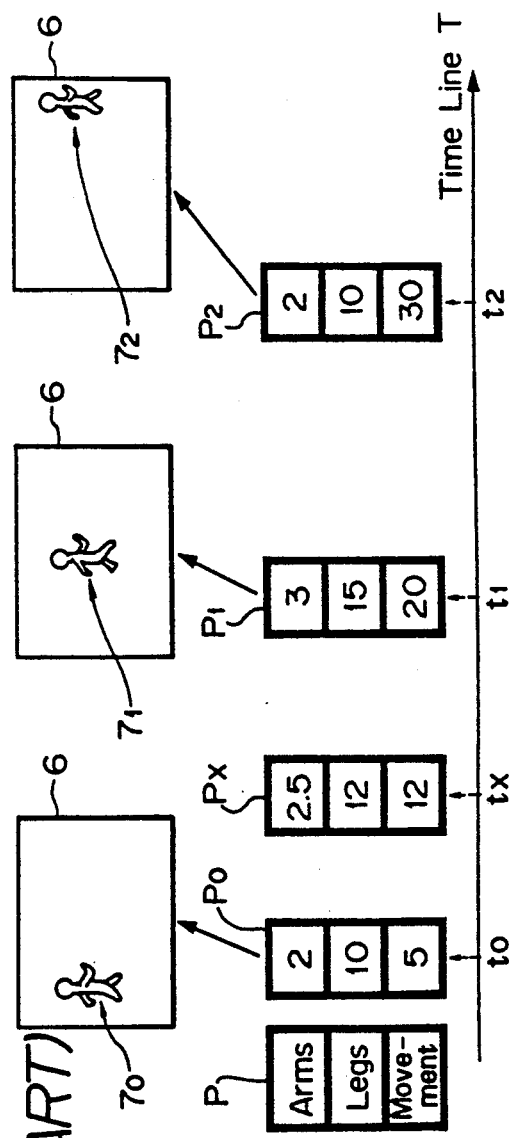
FIG. 2 is a schematic representation used to explain a time axis of parameters in the conventional animation producing apparatus of FIG. 1.

Referring to the drawings in detail, and initially to FIGS. 3 to 6, a first embodiment of the animation producing apparatus according to the present invention will be described hereinafter.

Figure 3:
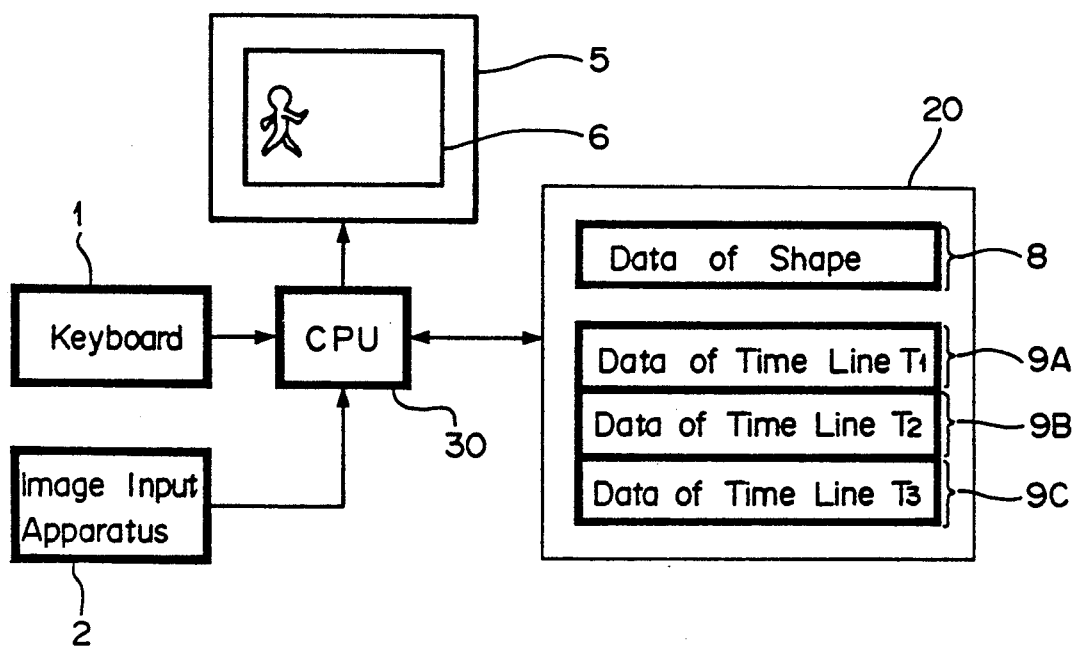
FIG. 3 is a schematic diagram showing a first embodiment of an animation producing apparatus according to the present invention.

As shown in FIG. 3, in the animation producing apparatus of the present invention, a storage area of a memory 20 is separated to provide an area 8 in which data of the fundamental configuration (referred to hereinafter as "fundamental shape") of a character are stored, an area 9A in which values of parameter Q along a time line $T_1$ are stored in units of the frame period, an area 9B in which values of parameter R along a time line $T_2$ are stored in units of the frame period and an area 9C in which values of parameter S along a time line $T_3$ are stored in units of the frame period. Flags are added to these areas 9A to 9C in order to indicate the time lines $T_1$ to $T_3$, respectively.

In this embodiment, the present invention is applied to an animation in which a character or man performs predetermined operations. In this embodiment, there are provided three parameters, i.e. parameter (arm parameter) Q used to designate motion of the man's arms, parameter (leg parameter) R used to designate motion of the man's legs and parameter (movement parameter) S used to designate motion of the man or character in the lateral direction.

As shown in FIG. 4 time axes (i.e. time lines) $T_1$, $T_2$ and $T_3$ are assigned to these three parameters Q, R and S, respectively. The fundamental configuration (fundamental shape) of the man as the character in this embodiment is comprised of the arm parameter Q which is formed with three kinds of shapes (FIGS. 5A, 5B and 5C) and the leg parameter R which is formed with three kinds of shapes (FIGS. 6A, 6B and 6C). The arm parameter Q is expressed by ratio of three numerals ($Q_A : Q_B : Q_C$), the leg parameter R is expressed by ratio of three numerals ($R_A : R_B : R_C$), and the movement parameter S is expressed by coordinate values in the lateral direction and which values fall in a range of 0 to 500. In that case, the ratio ($Q_A : Q_B : Q_C$) represents the mixing ratio for the shapes shown in FIGS. 5A, 5B and 5C, and the ratio ($R_A : R_B : R_C$) represents the mixing ratio for shapes shown in FIGS. 6A, 6B and 6C.

A process for producing an animation according to this embodiment will be described with reference to FIGS. 4A–4C.

Figure 4A:
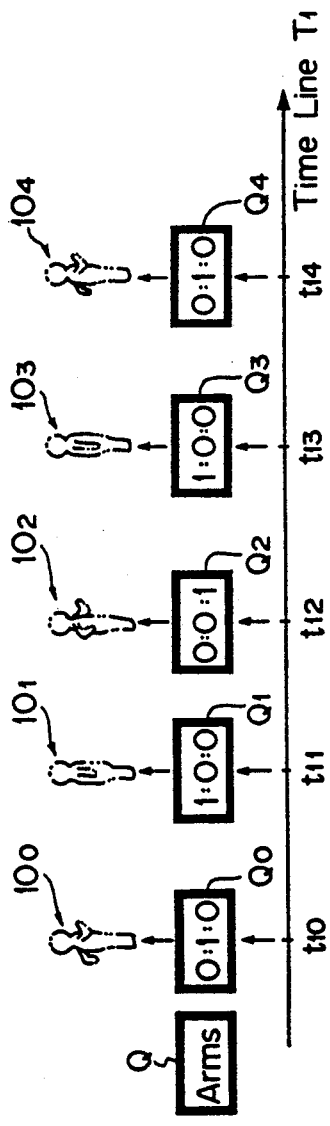
FIGS. 4A–4C are schematic diagrams used to explain time axes of parameters in the animation producing apparatus of the present invention shown in FIG. 3.

As shown in FIG. 4A, the operator selects a series of timing points $t_{10}$ to $t_{14}$ along the time line $T_1$, and determines values $Q_0$ to $Q_4$, (ratio of three numerals) of the arm parameter Q in response to these timing points $t_{10}$ to $t_{14}$. The values $Q_0$ to $Q_4$ of the arm parameter Q correspond to FIGS. $10_0$ to $10_4$ which show the motions of the arms. Then, at respective timing points of frame period except the timing points $t_{10}$ to $t_{14}$ along the time line $T_1$, the CPU 30 of the example of FIG. 3 performs the interpolation operation to calculate the values of the arm parameter Q, and the thus calculated values are stored in the area 9A of the memory 20. Then, as shown in FIG. 4B, the operator selects a series of timing points $t_{20}$ to $t_{26}$ along the time line $T_2$, and determines values $R_0$ to $R_6$ (ratio of three numerals) of the leg parameter R in response to these timing points $t_{20}$ to $t_{26}$. The values $R_0$ to $R_6$ of the leg parameter R correspond to FIGS. $11_0$ to $11_6$ which show the motions of legs. Thereafter, values of leg parameter R at other timing points on the time line $T_2$ are calculated by the interpolation operation and stored in the area 9B of the memory 20.

Figure 4B:
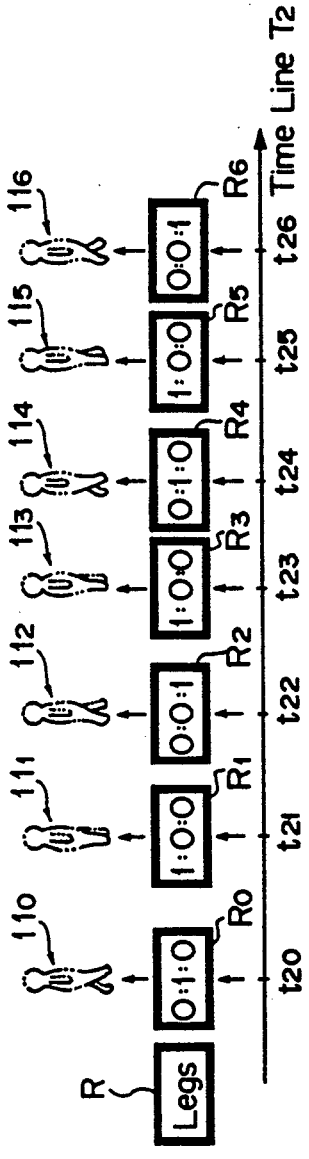
Figure 4C:
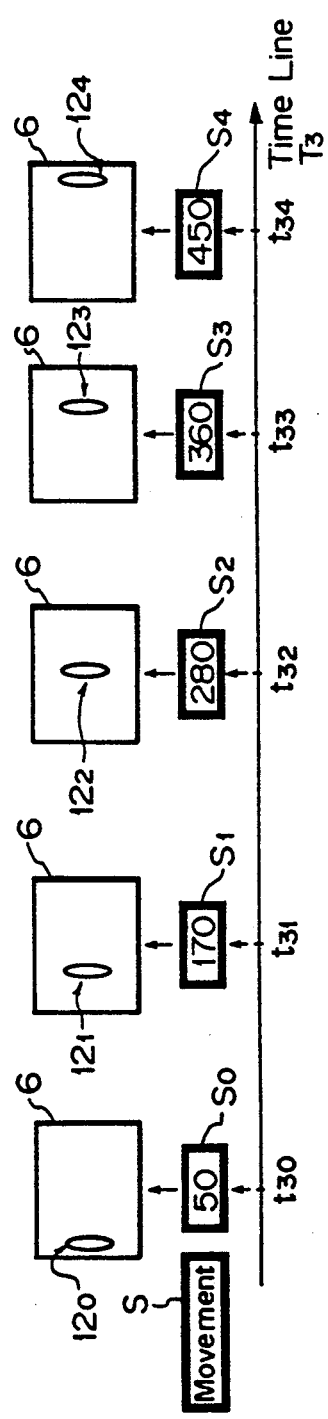

Further, as shown in FIG. 4C, the operator selects a series of timing points $t_{30}$ to $t_{34}$ along the time line $T_3$, and determines values $S_0$ to $S_4$ of the movement parameter S in response to these timing points $t_{30}$ to $t_{34}$. The values $S_0$ to $S_4$ of the movement parameter S correspond to the man's positions $12_0$ to $12_4$ on the display screen 6 of the image display apparatus 5. Values of the movement parameter S at other timing points on the time line $T_3$ are calculated by the interpolation operation and stored in the area 9C of the memory 20.

Finally, the time lines $T_1$, $T_2$ and $T_3$ shown in FIG. 4 are executed simultaneously. That is, the CPU 30 sequentially reads out the values of the three parameters Q, R and S from the memory 20 in units of the frame period, and then calculates data of respective shapes stored in the memory 20 in response to the values of the above-described parameters to sequentially determine the entire shape of the man, that is, the character in units of the frame period. The thus determined entire shapes are sequentially displayed on the display screen 6 of the image display apparatus 5.

In this embodiment, if it is requested that the character, i.e. the man moves, for example, his arms more quickly, the operator reduces an interval between the timing points $t_{10}, t_{11}, \ldots$, along the time $T_1$ shown in FIG. 4A and once again determines values of the arm parameter Q in response to new timing points $t_{10}, t_{11}, \ldots$, but unlike the prior art, the parameters R and S of FIGS. 4B and 4C need not be determined once again. In other words, the leg and movement parameters R and S need not be determined once again and only the arm parameter Q need be corrected, added or deleted. Similarly, if it is requested to move the man from right to left on the display screen 6, the operator may change the value of the movement parameter S along the time line $T_3$ shown in FIG. 4C. Therefore, according to this embodiment, the motion of a certain part of the man provided as the character can be corrected readily with ease. There is then the substantial advantage in that the animation can be made efficiently.

A routine in which the procedure for producing an animation in the examples of FIGS. 4A–4C is generalized will be described with reference to FIG. 7. In that case, n assumes the number of parameters to designate motions of character, and m assumes the number of time lines ($m \leq n$).

Figure 7:
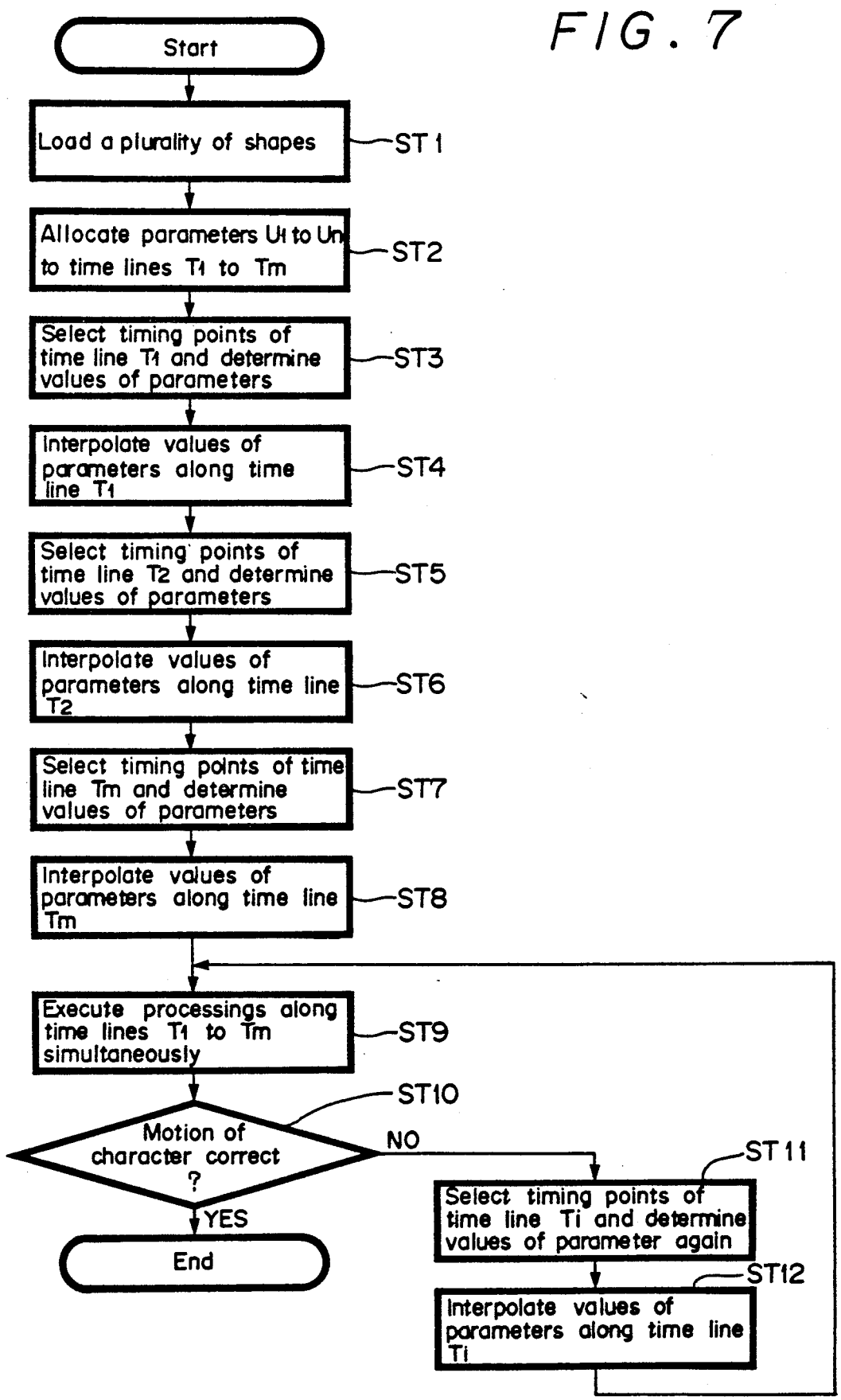
FIG. 7 is a flow chart to which reference will be made in explaining the routine in which an animation is produced by the animation producing apparatus of FIG. 3.

Referring to FIG. 7, in step ST1, the operator loads in the memory 20 data of a plurality of shapes which are fundamental configurations of the character. At step ST2, n parameters $U_1$ to $U_n$ are allocated to m time lines $T_1$ to $T_m$. Then, the operator selects a plurality of timing points along the time line $T_1$ and determines values for the parameters corresponding to these selected timing points (in step ST3). Thereafter, the CPU 30 carries out the interpolation operation of the values of parameters along the time line $T_1$ (in step ST4).

Similar processings along the time lines $T_2$ to $T_m$ are executed from steps ST5 to ST8, and then in step ST9, the CPU 30 executes the processings along the time lines $T_1$ to $T_m$ simultaneously, whereby the animation of the character is displayed on the display screen 6. In the next decision step ST10, the operator checks to see whether or not the motion of character is correct. To be more concrete, the operator checks to see whether or not the character moves in exactly the same correct way as those designated by the parameters of the respective time lines. If a YES is output at step ST10, the routine for producing animation is ended.

If it is determined in step ST10 that the motion of the character corresponding, for example, to a time line Ti ($1 \leq i \leq m$) is not correct, in step ST11, the operator selects again a plurality of new timing points along the time line Ti and determines values of parameters corresponding to those new timing points selected once again. In step ST12, the CPU 30 performs the interpolation operation of the values of parameters along the time line Ti, and the processing of the CPU 30 returns to step ST9, wherein the processings for the time lines $T_1$ to $T_m$ are simultaneously executed. Steps ST9 to ST12 are repeated until the motion of the character becomes correct.

Also in this embodiment of FIG. 7, the motion of a certain part of the character may be corrected by correcting the corresponding time lines of the parameters for designating the motion, which makes it possible to produce the animation more efficiently.

According to the above embodiment of the present invention, since the motion of a certain part of character can be corrected with ease by correcting a series of timing points of a certain group within a plurality of groups and by correcting values of parameters corresponding to a series of timing points, it is possible to produce an animation more efficiently.

Another embodiment of the animation producing apparatus according to the present invention will be described, in which a synthesized parameter is generated on the basis of pre-determined parameters and parameters inputted by means of parameter input means and an input video image is transformed on the basis of the synthesized parameter, thereby an animation, which presents a desired change is displayed in a real time fashion. A further embodiment of the animation producing apparatus according to the present invention will be described, in which a synthesized sound can be generated in response to a MIDI (i.e. musical instrument digital interface) signal and an input video image is transferred on the basis of parameters generated, thereby an animation is displayed in a real time fashion.

Figure 8:
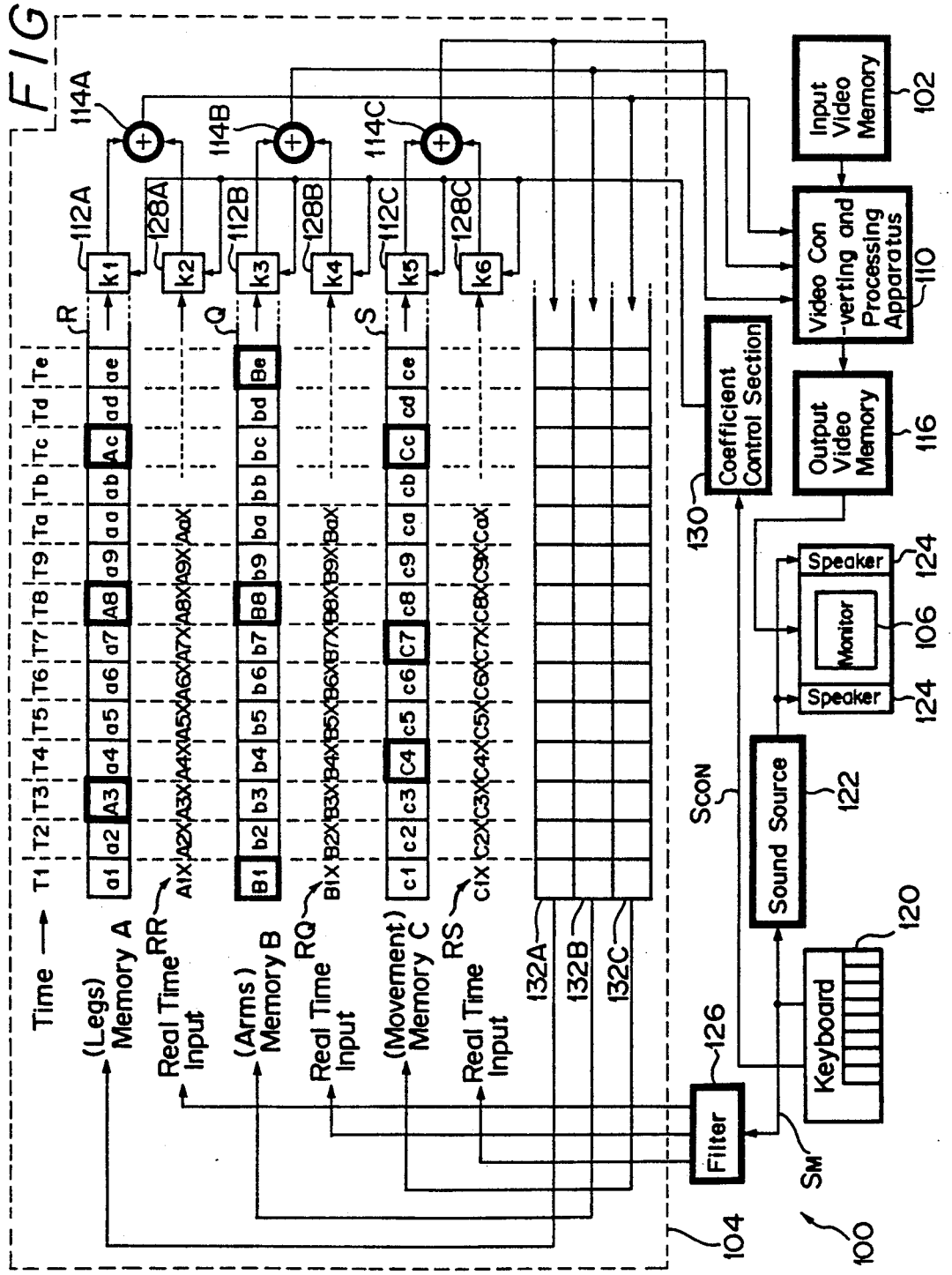
FIG. 8 is a block diagram showing a second embodiment of the animation producing apparatus according to the present invention.

FIG. 8 is a schematic block diagram showing the abovementioned animation producing apparatus of the present invention.

In FIG. 8, reference numeral 100 generally designates an animation producing apparatus which produces an animation in a real time fashion.

In the animation producing apparatus 100, data of the fundamental configuration (fundamental shape) of a character is obtained by an image pickup device (not shown) and this data of the fundamental shape is stored in an input video memory 102.

As shown in FIGS. 5 and 6, the input video memory 102 stores therein three fundamental configurations (fundamental shapes) (see FIGS. 6A, 6B and 6C) associated with the motion of legs of a character and three fundamental configurations (fundamental shapes) (see FIGS. 5A, 5B and 5C) associated with the motion of arms of the character.

In response thereto, a parameter memory 104 stores at its memories A, B and C a parameter Q associated with the motion of legs, a parameter R associated with the motion of arms, and a parameter S associated with the display position of the character, respectively.

These parameters Q, R and S are sequentially allocated to time axes (i.e. expressed in the units of hour, minute, second and frame number) and stored in the memories A, B and C, respectively, whereby the fundamental shapes stored in the input video memory 102 are transferred and synthesized in response to the parameters Q, R and S, thereby displaying the character in a desirable motion.

In the memory A in which the parameter R is stored, the operator designates desirable timing points $T_3$, $T_8$ and $T_c$ and also designates the motion of legs so that the shapes of the legs of the character displayed on a monitor 106 become identical with those of legs (FIGS. 6A, 6B and 6C) stored in the input video memory 102 at the timing points $T_3$, $T_8$ and $T_c$. Thus, parameters Q of values A3, A8 and Ac are stored in this memory A at timing points $T_3$, $T_8$ and $T_c$.

Parameters Q of values a1, a2, a4 to a7, a9 to ab, ad, ae, . . . are generated from values A3, A8 and Ac of parameters Q at timing points $T_3$, $T_8$ and $T_c$ by the interpolation operation method and allocated to timing points before and after the timing points $T_3$, $T_8$ and $T_c$.

Similarly, in the memory B in which the parameters R are stored, the operator designates desirable timing points $T_1$, $T_8$ and $T_e$ and also designates the motion of arms so that the shapes of the arms of the character displayed on the monitor 106 become identical with those of the arms (FIGS. 5A, 5B and 5C) stored in the input video memory 102 at timing points $T_1$, $T_8$ and $T_e$, resulting in the parameters R of values B1, B8 and Be being stored therein at points $T_1$, $T_8$ and $T_e$.

Further, parameters R of values b2 to b7, b9 to bd, . . . are generated from values B1, B8 and Be of the parameters R at timing points $T_1$, $T_8$ and $T_e$ by the interpolation operation method and allocated to timing points before and after the timing points $T_1$, $T_8$ and $T_e$.

In the memory C in which the parameter S are stored, the operator designates desirable timing points $T_4$, $T_7$ and $T_c$ and also designates display positions of characters displayed on the monitor 106 at timing points $T_4$, $T_7$ and $T_c$, whereby the parameters S of values C4, C7 and Cc are stored therein at timing points $T_4$, $T_7$ and $T_c$.

Furthermore, parameters S of values c1 to c3, c5, c6, c8 to cb, cd, ce, . . . are generated from values C4, C7 and Cc of the parameters S at timing points $T_4$, $T_7$ and $T_c$ by the interpolation operation method and allocated to timing points before and after the timing points $T_4$, $T_7$ and $T_c$.

A video converting and processing apparatus 110 is supplied with the parameters R, Q and S through weighting circuits 112A, 112B and 112C and adding circuits 114A, 114B and 114C. The parameters R, Q and S are supplied thereto in the sequential order in which these parameters are allocated to the time axes.

Further, the video converting and processing apparatus 110 is supplied with the shape data stored in the input video memory 102, and transforms the shapes of respective parts of the character expressed by the shape data in response to the values of the parameters R, Q and S.

More specifically, the video converting and processing apparatus 110 transforms the video image, that is, transforms the shapes of the legs of the character so that the character may walk and gradually transforms the shapes of legs at timing points $T_1$ and $T_2$ until the transformed shape becomes identical with the shape (FIG. 6A) stored in the input video memory 102 at timing point $T_3$.

Further, the video converting and processing apparatus 110 transforms the shape of the character gradually during a period from timing points $T_3$ to $T_7$ and transforms the video image so that it may become identical with the shape (see FIG. 6B) stored in the input video memory 102 at timing point $T_8$.

The shape of the arm of the character is transformed so that the character may move the arms. That is, the shape is transformed so that the shape becomes identical with the shape (FIG. 5A) stored in the input video memory 102 at timing point $T_1$, and is gradually changed from timing points $T_2$ to $T_8$ so that the shape becomes identical with the shape (FIG. 5B) stored in the input video memory 102 at timing point $T_8$.

The video converting and processing apparatus 110 synthesizes the shapes of the legs and arms transformed at timing points $T_1$, $T_2$, . . . so as to form the entire configuration of character, and places the thus formed entire shape of the character at a position determined by the parameter S.

An output video memory 116 temporarily stores therein a video image generated by the video converting and processing apparatus 110, and converts the same into a video signal. This video signal is fed to the monitor 106.

Therefore, the monitor 106 can display the animation which changes in the same way as is determined by the operator.

A keyboard 120 supplies a sound source 122 with a signal $S_M$ (referred to hereinafter as an MIDI signal) according to the MIDI standards, whereby a speaker 124 is driven to emanate a synthesized sound in response to the key operation of the keyboard 120.

A filter 166 is formed of an operation and processing circuit and detects musical scale, stress and length of the synthesized sound emanated from the speaker 124 on the basis of the MIDI signal $S_M$ thereby to generate three parameters RR, RQ and RS on the basis of the detected results.

At that time, the filter 126 generates the parameters RR, RQ and RS at cycles coincident with the time axes of the parameters R, Q and S respectively stored in the memories A, B and C and supplies these parameters RR, RQ and RS to weighting circuits 128A, 128B and 128C, respectively.

Further, at that time, the filter 126 generates the parameters RR, RQ and RS such that the values thereof are changed within the ranges corresponding to the parameters R, Q and S.

Therefore, the weighting circuits 128A, 128B and 128C are respectively supplied with the parameters RR, RQ and RS of values A1X, A2X, . . . , B1X, B2X, . . . and C1X, C2X, . . . in response to the parameters R, Q and S when the player starts to play the keyboard 120.

A coefficient control section 130 receives a control signal $S_{CON}$ which is generated from the keyboard 120 each time the player plays the keyboard 120, and supplies weighting coefficients K1, K3, K5 and K2, K4, K6 to the weighting circuits 112A, 112B, 112C and 128A, 128B, 128C in response to the control signal $S_{CON}$, respectively.

The weighting circuits 112A, 112B, 112C and 128A, 128B, 128C are adapted to weight the parameters R, Q, S and RR, RQ, RS in response to the weighting coefficients K1, K3, K5 and K2, K4, K6, respectively.

The adding circuits 114A, 114B and 114C add weighted results of the weighting circuits 112A, 112B, 112C and 128A, 128B, 128C and supply the added results to the video converting and processing circuit 110.

Thus, when the player plays the keyboard 120, the video converting and processing apparatus 110 is supplied with a synthesized parameter which results from synthesizing the parameters R, Q, S and the parameters RR, RQ, RS instead of the parameters R, Q and S, and transforms the shape of the character stored in the input video memory 102 on the basis of the synthesized parameter.

Therefore, the video converting and processing apparatus 110 can generate the synthesized parameter whose value is changed with the weighting coefficient from the coefficient control section 130 in accordance with the playing of the keyboard 120. Consequently, the animation can be produced by transforming the shape of character on the basis of the synthesized parameter, thereby producing the animation which is changed in response to the playing of the keyboard 120. A video image signal formed by the video converting and processing circuit 110 is supplied through the output video memory 116 to the monitor 106, thereby being displayed.

By switching the weighting coefficients, it is possible to obtain an animation in which the motion following the playing of the keyboard 120 is subordinated to the motions pre-determined in the memories A, B and C or conversely an animation in which the motions pre-determined in the memories A, B and C are subordinated to the motion following the playing of the keyboard 120, resulting in the animation being formed in a wide variety of expression styles.

Further, since the animation producing apparatus 100 generates the parameters RR, RQ and RS on the basis of the MIDI signal $S_M$, the animation producing apparatus 100 can use a so-called rhythm machine which can generate the MIDI signal $S_M$ in place of the keyboard 120 or the like, or can produce a synthesized sound by further connecting thereto an arithmetic processing unit and thereby produce an animation. Therefore, the animation producing apparatus of this embodiment can be used more conveniently.

Further, in this embodiment, the synthesized parameters from the adding circuits 114A, 114B and 114C can be stored in buffer memories 132A, 132B and 132C, and the parameters R, Q and S stored in the memories A, B and C can be replaced with the synthesized parameters stored in the buffer memories 132A, 132B and 132C, if necessary.

The parameter memory 104 includes parameter transfer means, though not shown, to transfer the synthesized parameters stored in the buffer memories 132A, 132B and 132C to the memories A, B and C. Thus, when the operator operates a predetermined key within the keyboard 120, the synthesized parameters are transferred to the memories A, B and C.

Therefore, the motion of animation is visually confirmed by means of the monitor 106 and, if necessary, the synthesized parameters used to produce that animation can be stored in the memories A, B and C.

Accordingly, improvised animation can be reproduced by updating the contents of the memories A, B and C.

Further, if the animation producing apparatus of the present invention is applied to the correcting work of animation, then this correcting work can be carried out with ease.

As described above, according to this embodiment, while the input video memory 102 constructs the input video memory in which a plurality of fundamental shapes are stored, the memories A, B and C construct main memories in which the parameters R, Q and S used to designate the motion of animation are sequentially stored in a time series fashion.

In the animation producing apparatus 100 of the present invention, as described above, the fundamental shape data of the character picked-up by the camera means is stored in the input video memory 102.

When the operator designates timing points and the motions of respective parts of the character, the parameters R, Q and S presenting the shapes of legs and arms of the character and the display position of the character are allocated to the time axes and area stored in the memories A, B and C, respectively.

When the player plays the keyboard 120 after the above preliminary processing, the parameters RR, RQ and RS corresponding to the parameters R, Q and S are sequentially generated from the filter 126 in response to the MIDI signal $S_M$ from the keyboard 120. Then, these parameters RR, RQ and RS are respectively weighted by the weighting circuits 128A, 128B and 128C in response to the operation of the player.

Simultaneously, the parameters R, Q and S stored in the memories A, B and C are respectively weighted by the weighting circuits 112A, 112B and 112C, and the weighted results of the weighting circuits 112A, 128A; 112B, 128B; and 112C, 128C are added by the adding circuits 114A, 114B and 114C, respectively.

Therefore, the adding circuits 114A, 114B and 114C can derive the synthesized parameters whose values are changed in accordance with the playing of the keyboard 120. Then, the video converting and processing apparatus 110 transforms the fundamental shapes of the respective parts of the character stored in the input video memory 102 on the basis of the synthesized parameters.

Transformed shapes of the respective parts of the character are synthesized by the video converting and processing apparatus 110 thereby to form the entire shape of the character. Then, the entire shape of the character is placed at the display position determined by the parameter S, thereby obtaining in a real time manner an animation whose motion is changed in response to the operation of the keyboard 120.

At that time, the synthesized sound generated by the sound source 122 is emanated from the speaker 124 and the animation which is changed in accordance with the playing of the keyboard 120 in a real time manner can be displayed on the monitor 106.

By using other playing and arithmetic processing apparatus instead of the thus arranged keyboard 120, the parameters RR, RQ and RS can be generated on the basis of the MIDI signals from these apparatus.

While the parameters are generated on the basis of the MIDI signal as described above, the present invention is not limited thereto and various kinds of signals other than the MIDI signal can be widely applied to the present invention.

In that case, if parameters are generated on the basis of input signals from other apparatus such as a mouse, a digitizer and so on, it is possible to produce an animation whose motion is changed in response to the operation of the digitizer, the mouse or the like.

Further, if parameters are formed on the basis of natural sound and the like recorded on a tape of a tape recorder or the like, it is possible to produce an animation whose motion is changed with the natural sound.

While the legs, arms and display position of the character are designated by means of the parameters to produce animations in the above-described embodiment, the present invention is not limited thereto and the present invention can be widely applied to the cases such as when the direction of other character is changed while animations are produced or when a video image not part of the character, for example, a man's look is changed.

According to the above-described invention, since the synthesized parameters are formed on the basis of the predetermined parameters and the parameters inputted by means of the parameter input means and the input video image is transformed in response to the synthesized parameters, it is possible to display on the monitor animations which present desirable changes in a real time fashion.

Furthermore, since the synthesized sound is emanated in response to the MIDI signal and the input video image is transformed on the basis of the parameters generated, an animation which presents a desirable change in response to the synthesized sound can be displayed on the monitor in a real time fashion.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. An animation producing apparatus for producing an animation of a plurality of fundamental shapes having respective animated parts on the basis of a plurality of parameters relating to predetermined operations of respective animated parts of the plurality of fundamental shapes, comprising:

a) input means for inputting a plurality of fundamental shapes having respective animated parts and for separately inputting a respective plurality of sets of predetermined operation parameters relating to predetermined operations of respective ones of the plurality of fundamental shapes having respective animated parts;

b) memory means connected to said input means for storing in a first area therein said plurality of fundamental shapes having respective animated parts and for storing in respective separate, second areas therein said plurality of sets of predetermined operation parameters, values of said plurality of parameters stored in said separate, second areas of said memory means being varied, added or deleted by said input means independently of each other;

c) computing means for separately interpolating operations for each respective animated part of said plurality of fundamental shapes on the basis of said plurality of predetermined operation parameters read-out from said memory means and for producing an animation signal based on the interpolated operations and said predetermined operations; and d) display means for displaying thereon the animation signal produced by said computing means from said animation signal.

2. An animation producing apparatus for producing an animation on the basis of a plurality of fundamental shapes each having respective animated parts and a plurality of predetermined operation parameters relating thereto, comprising:

1) first memory means for storing therein a plurality of fundamental shapes each having respective animated parts;

2) second memory means for storing a respective plurality of first parameters, where each first parameter corresponds to a first operation of an animated part of a respective one of said plurality of fundamental shapes;

3) input means for inputting a plurality of second parameters, where each second parameter corresponds to a second operation of an animated part of a respective one of said plurality of fundamental shapes;

4) a plurality of adding means for adding respective ones of said plurality of first parameters read-out from said second memory means and said respective ones of said plurality of second parameters inputted by said input means, thereby to generate a plurality of third parameters;

5) image processing means for separately interpolating operations of said animated parts of said plurality of fundamental shapes read-out from said first memory means based on said plurality of third parameters generated from said plurality of adding means and for producing an interpolated animation signal; and 6) display means for displaying the animation produced by said image processing means from said animation signal.

3. The animation producing apparatus according to claim 2, further comprising coefficient control means responsive to said input means for supplying respective weighting coefficients to said plurality of adding means.

4. The animation producing apparatus according to claim 2, wherein said input means is comprised of a keyboard which generates a MIDI (musical instrument digital interface) signal and parameter generating means for generating said second parameters whose values are changed in response to changes in said MIDI signal.

5. The animation producing apparatus according to claim 4, further comprising synthesized sound generating means for generating a synthesized sound on the basis of said MIDI signal generated from said keyboard.

6. The animation producing apparatus according to claim 5, wherein said parameter generating means generates said second parameters whose values correspond to musical scale, stress and length of the synthesized sound generated by said synthesized sound generating means.

7. The animation producing apparatus according to claim 2, further comprising a plurality of weighting circuits respectively receiving said plurality of second parameters input by said input means and producing a plurality of respective weighted outputs fed to said plurality of adding means also receiving said plurality of first parameters from said second memory means for generating therefrom said plurality of third parameters.

8. An animation producing apparatus for producing an animation on the basis of a plurality of fundamental shapes having respective animated parts and a plurality of parameters relating to predetermined operations of respective ones of the plurality of fundamental shapes, comprising:

A) memory means for storing the plurality of fundamental shapes having respective animated parts;

B) MIDI (musical instrument digital interface) signal generating means for generating a MIDI signal;

C) parameter generating means for generating a plurality of parameters, where each parameter corresponds to a predetermined operation of a respective fundamental shape, on the basis of said MIDI signal;

D) image processing means for separately interpolating for each of said plurality of fundamental shapes read-out from said memory means operations of said animated parts of respective fundamental shapes based on said plurality of parameters generated from said parameter generating means and for producing an animation signal based on interpolated operations and said predetermined operations of said fundamental shapes;

E) display means for displaying thereon the animation produced by said image processing means from said animation signal; and F) synthesized sound generating means for generating a synthesized sound on the basis of said MIDI signal.

9. The animation producing apparatus according to claim 8, wherein said parameter generating means generates said plurality of parameters having values corresponding to respective notes of a musical scale, to stress, and to length of the synthesized sound generated by said synthesized sound generating means.

* * * * *